United States Patent [19]

Olney et al.

[11] Patent Number: 5,707,215
[45] Date of Patent: Jan. 13, 1998

[54] TUNED RESONANT OSCILLATING MASS INFLATION PUMP AND METHOD OF EXTRACTING ELECTRICAL ENERGY THEREFROM

[75] Inventors: Ross D. Olney, West Hills; William S. Griffin, Manhattan Beach; Donald K. Murphy, Placentia, all of Calif.

[73] Assignee: Hughes Aircraft Company, Los Angeles, Calif.

[21] Appl. No.: 338,987

[22] Filed: Nov. 14, 1994

[51] Int. Cl.⁶ .................................................. F04B 17/06
[52] U.S. Cl. ........................ 417/233; 417/328; 152/418
[58] Field of Search ........................... 152/418; 417/231, 417/233, 328

[56] References Cited

U.S. PATENT DOCUMENTS

| | | | |
|---|---|---|---|
| 2,055,983 | 9/1936 | Peo | 417/328 |
| 2,939,504 | 6/1960 | Bedford, Jr. | 152/418 |
| 4,349,064 | 9/1982 | Booth | 152/418 |
| 4,570,691 | 2/1986 | Martus | 417/233 |
| 4,651,792 | 3/1987 | Taylor | 417/233 |
| 4,840,212 | 6/1989 | Wei | 152/419 |
| 4,922,984 | 5/1990 | Dosjoub et al. | 417/233 |
| 5,201,968 | 4/1993 | Renier | 152/418 |
| 5,355,924 | 10/1994 | Olney | 417/233 |
| 5,409,049 | 4/1995 | Renier | 417/233 |

OTHER PUBLICATIONS

Mechanical Vibrations, J. P. Den Hartog, The Standard Handbood for Mechanical Engineers by Baumeister & Marks, pp. 119, 272–281.
Standard Handbook for Mechanical Engineers, T. Baumeister and L. S. Marks, p. 5–98 and 5–99.

*Primary Examiner*—Timothy Thorpe
*Assistant Examiner*—Peter G. Korytnyk
*Attorney, Agent, or Firm*—V. D. Duraiswamy; W. K. Denson-Low

[57] ABSTRACT

Disclosed is a tuned resonant oscillating mass pump, and particularly a pump structure and assembly which can be conveniently and readily mounted inside automotive tires for the purposes of maintaining optimum tire pressure and generating of electrical power from the movement of the tuned oscillating mass in such pumps. The oscillating mass can be a pendulum or a freely moving weight or a ball rolling within an arcuate chamber.

13 Claims, 12 Drawing Sheets

TUNED RESONANT OSCILLATING MASS INFLATION PUMP AND METHOD OF EXTRACTING ELECTRICAL ENERGY THEREFROM

BACKGROUND OF THE INVENTION

1. Field of the Invention

This invention relates in general to gas compressors and pumps, and, particularly, to the extraction of energy from a tuned oscillating mass, and more particularly relates to a tuned resonant oscillating mass pump structure and assembly which can be conveniently and readily mounted either inside automotive tires or outside on their rims for maintaining optimum tire pressure and generating electricity from the movement of the tuned oscillating mass in the pump.

2. Description of the Related Art

The Society of Automotive Engineers estimates that a vehicle whose tires are inflated at 20% below their specified pressure is penalized 3–5% in terms of fuel economy.

The Department of Energy estimates that this country wastes 4.2 million gallons of gasoline per day due to increased rolling resistance caused by low tire pressures. Firestone Corporation studies show that the serviceable life of a metric radial tire designed for 35 psi, but inflated to only 24 psi, is reduced by 50%. The National Highway Transportation and Safety Administration suggests that low tire pressure may cause 250,000 accidents annually. Finally, improperly inflated tires can degrade the performance of the most well-designed and finely tuned suspension system, and even adversely affect anti-lock braking.

Nevertheless, the inconvenience of checking tire pressures deters many from this simple maintenance routine; the result, according to Highway Administration figures, is that about half the passenger cars on the road have at least one under inflated tire. Because ride and handling degrade so gradually, a slow leak may not be detected until it becomes dangerous or a tire is ruined. Even sound tires are permeable and can lose as much as 25% of their air pressure over a years time.

Existing tire pressure management systems, either integrated to a monitoring system or by themselves, are known in the art. One such class of systems have generally comprised a pump mounted on the vehicle wheel to rotate therewith, the plunger of the pump being positively actuated by engagement with an element, usually a cam, mounted on the axle or an axle support.

A pump apparatus that can be attached to the valve of an automobile tire in order to pressurize the pneumatic chamber of the tire and thereby maintain tire pressure at a preset value is described in U.S. Pat. No. 5,201,968, "Tire Pressuring and Regulating Apparatus", inventor Grant J. Renier. The apparatus utilizes cyclic forces generated at a location eccentric from the axis of rotation of a rolling wheel. The apparatus comprises pumps responsive to the cyclically ever changing resultant force of centrifugal and gravitational forces for pressurizing air to inflate the pneumatic tire.

Many of these systems usually require mechanical modification of the axle or its supporting structure to accommodate the cam element.

Another class of these conventional systems uses a centrifugal-force pump concept for placement inside automotive tires for the purpose of maintaining optimum tire pressure.

Another class of self-energizing tire pressure management systems utilizes gravity to drive one or more reciprocating pumping plungers. An example is found in U.S. Pat. No. 2,055,983 to Peo for an automatic tire inflation system which is detachably mounted on the wheel with little to no mechanical modification of the wheel or axle structure, and has one or more pumping plungers operated by a weight which reciprocates in the pump frame solely in response to gravity as the wheel rotates.

Yet another class places a compressor unit on a vehicle chassis and pumps air to the tires through the wheel bearings while the vehicle is moving. This system adds a great deal of weight to the vehicle as well as compressor noise during its operation.

However, these conventional systems are inefficient and cumbersome in actual installation and use. Therefore, there is a need for gas compressors and pumps which can extract useful energy and more particularly, a need for a pump structure and assembly which can be conveniently and readily mounted either inside automotive tires or outside on their rims for maintaining optimum tire pressure and generating electrical power.

In a totally different application relating to crankshafts, a device commonly used to damp crankshaft vibrations uses a resonant tuned oscillating mass to generate mechanical energy and power. Such devices are described in textbooks such as *Mechanical Vibrations* by den Hartog and *The Standard Handbook for Mechanical Engineers* by Baumeister & Marks. The device uses an oscillating mass whose frequency of oscillation is intrinsically tuned to the vibrational frequency of the crankshaft to which it is attached. This matching of pendulum frequency to vibrational speed occurs, as will be shown, at all vibrational speeds.

FIG. 1 is a schematic of a pendulum/pivot as it oscillates under the influence of both a cyclic gravity force, $F_g$, and a radial centripetal acceleration, $F_c$.

As can be seen, the centripetal acceleration force $F_c$ can be resolved into two components, one along the axis of the pendulum, $F_a$, and one perpendicular to the pendulum, $F_r$. This perpendicular force will tend to restore the pendulum to its centered condition. Because of this, the pendulum will oscillate back and forth in the radial centripetal acceleration field.

if the polar moment of inertia of the pendulum mass 10 about its center of gravity is neglected, for the sake of convenience in illustration, the motion of the pendulum is simply described by the following differential equations showing the summation of torques about the pendulum pivot axis.

The torque about the pendulum pivot axis is given by computing the radial acceleration force on the pendulum mass $M\omega^2 L_3$, and multiplying it by the sine of the difference between angles $\theta_1$ and $\theta_2$, and by the lever arm, $L_2$. where $L_1$ is the distance between the pivot point 16 and the center of rotation 18 of the device to which it is attached, $L_2$ is the length of the pendulum (lever arm) and $L_3 = L_1 + L_2$:

$$\tau = M\omega^2 L_3 \sin(\theta_1 - \theta_2) L_2 \tag{1}$$

The moment of inertia that the pendulum mass 10 makes about its pivot point is:

$$I_p = M L_2^2 \tag{2}$$

By geometry:

$$L_2 \sin(\theta_2) = L_3 \sin(\theta_1) \tag{3}$$

For the case of relatively small angles, $$\theta_1 \cong \theta_2 \frac{L_2}{L_1+L_2} \quad (4)$$

$$L_3 = L_1 + L_2 \quad (5)$$

which results in the simplifying approximations:

$$\theta_2 - \theta_1 \cong \left(\frac{L_1}{L_1+L_2}\right)\theta_2 \quad (6)$$

$$\tau = M\omega^2 L_1 L_2 \theta_2 \quad (7)$$

The effective angular spring constant created by the centripetal acceleration field on the pendulum mass 10 may be thus expressed as:

$$K_\theta = \frac{d\tau}{d\theta_2} \cong M\omega^2 L_1 L_2 \quad (8)$$

Now, the natural frequency of a mechanical oscillator consisting of a moment of inertia, $I_p$, restrained by a torsional spring, $K_q$, is well known to be:

$$\omega_n = \sqrt{\frac{K_e}{I_p}} \quad (9)$$

Substituting the relations of (2) and (8) above, yields a natural frequency for the pendulum of:

$$\omega_n \cong \sqrt{\frac{M\omega^2 L_1 L_2}{ML_2^2}} = \sqrt{\omega^2\left(\frac{L_1}{L_2}\right)} = \omega\sqrt{\frac{L_1}{L_2}} \quad (10)$$

It is seen from the above equation that the natural frequency, $\omega_n$, of the pendulum will be exactly equal to the vibrational velocity, $\omega$, of the device to which it is attached if $L_1=L_2$. The pendulum's natural frequency thus tracks the vibrational speed of the crankshaft for all vibrational speeds.

As mentioned earlier, the phenomenon discussed above is well known in the area of harmonic dampers for crankshafts. Sources which describe it include den Hartog and Marks. The natural frequency of such a damper is tuned to a harmonic of the crankshaft's rotational speed, with the harmonic corresponding to the number of independently firing pistons on the crankshaft. This permits it to resonantly absorb transient forces from the pistons at all crankshaft speeds. This is the most evident point to transfer vibrational energy to a resonator. The resonator (harmonic damper) increases its amplitude of oscillation until dissipating frictional forces are sufficient to suppress crankshaft vibration. In the crankshaft application, the motion of the pendulum is used to generate frictional energy dissipation. This frictional energy dissipation reduces the amplitude of vibration of the crankshaft but produces no useful work. Vibration damping is the primary objective in the crankshaft application.

The two totally different applications discussed above provide the background for the present invention which fulfills a need for gas compressors and pumps which can extract useful energy and more particularly, a need for a pump structure and assembly which can be conveniently and readily mounted either inside automotive tires or outside on their rims for maintaining optimum tire pressure and generating electrical power.

SUMMARY OF THE INVENTION

The present invention provides a tuned oscillating mass gas pump structure which is based on a tuned resonant oscillating mass that is powered by gravity and that is simple in installation and construction.

The present invention also provides a tuned oscillating mass structure which derives its energy from the rotating gravity vector relative to a rotating frame, for example, a wheel.

In a broad aspect, the pump of the present invention comprises a frame adapted to rotate, a chamber formed in the frame, piston means (for example, piston and connecting links) and reciprocating means. The piston means is adapted for reciprocal movement so that it can perform a pumping action for the discharge of gas from the frame whenever the piston means is reciprocated. The piston means at least partially extends into the chamber. The reciprocating means is disposed in the chamber and is coupled to the piston means. In response to the rotation of the frame, the reciprocating means causes reciprocal movement of the plunger. The reciprocating means is a mass which is freely movable within the chamber in an arcuate path in response to the rotation of the frame. The mass acts as tuned resonant oscillating mass with its resonant oscillation frequency matching the frame's rotational frequency. Various alternate mechanisms are disclosed for generating electrical energy from the movement of the mass within the chamber in response to the rotation of the frame. These mechanisms include piezoelectric bimorphs or stacks positioned in different locations within the frame and arrangements which feature a magnet and a pick-up coil magnetically coupled to the magnet. The mass itself can be a weight of any suitable configuration, for example a pendulum or a bell or cylinder capable of rolling within an arc track chamber.

The present invention provides a tuned oscillating mass air pump structure which can be conveniently and readily mounted either inside automotive tires or outside on their rims for the purpose of maintaining optimum tire pressure and the generation of electrical energy from the movement of the tuned oscillating mass in such pumps.

In the present invention, the tuned resonant oscillating mass structure tunes itself to the wheel's rotational speed and provides optimum energy input from the rotating gravity vector.

The tuned oscillating mass air pump structure of the present invention can be readily incorporated into existing wheel/axle mechanical structures without substantial mechanical modification of the wheel/axle structure to accommodate the placement or operation of the pump structure.

The present invention, either by itself or integrated with a monitoring system, can be incorporated into virtually any vehicle ranging from passenger cars to commercial trucks that use pneumatic tires. It provides a mechanism to efficiently extract useful energy from the rotating gravity field and to deliver this energy for purposes such as maintaining tire pressure and delivering electric power to on board instrumentation.

The novel features of construction and operation of the invention will be more clearly apparent during the course of the following description, reference being had to the accompanying drawings wherein has been illustrated a preferred form of the device of the invention and wherein like characters of reference designate like parts throughout the drawings.

BRIEF DESCRIPTION OF THE FIGURES

in FIG. 2B, electrical energy is extracted from the movement of the pendulum when the end of the pendulum strikes and deflects a piezoelectric bimorph;

in FIG. 2C, electrical energy is extracted from the movement of the pendulum cross-arms which deflect piezoelectric bimorphs;

in FIG. 2D, electrical energy is extracted from the movement of the end of the pendulum when the pendulum ends strike piezoelectric stacks;

in FIG. 2E, electrical energy is extracted from the movement of the pendulum cross-arms striking piezoelectric stacks;

in FIG. 2F, electrical energy is extracted from the movement of the pendulum by attaching piezo-electric crystals or slabs on either side of a flexure, where the flexure comprises the pivot of the pendulum;

in FIG. 2G, electrical energy is extracted from the movement of the pendulum by magnetizing the lower end of the pendulum and letting this magnetized end swing past an armature/pickoff coil combination;

In FIG. 3D, the coil is wrapped around the magnet; in FIG. 3E, the coil is located near the magnet but is not wrapped around it; and in FIG. 3F, the magnet is rotated by some suitable angle with respect to the position illustrated in FIGS. 3D and 3E;

DETAILED DESCRIPTION OF THE INVENTION

A number of preferred forms of the invention as embodied in a tuned resonant oscillating mass inflation pump are now described. Although described herein with particularity as an air pump for a vehicle wheel for explanatory purposes, it is to be understood that the gas pump of the present invention can be used for other applications as well.

The new pump concept of the present invention is based on a tuned resonant oscillating mass that is powered by gravity. Using gravity to drive the mechanism of the present invention rather than centrifugal force as has been done previously, provides for a much greater operating capacity for the pumping mechanism of the present invention. This is because the current design pumps once per wheel revolution rather than once per vehicle acceleration as did previous designs.

Figure 1:
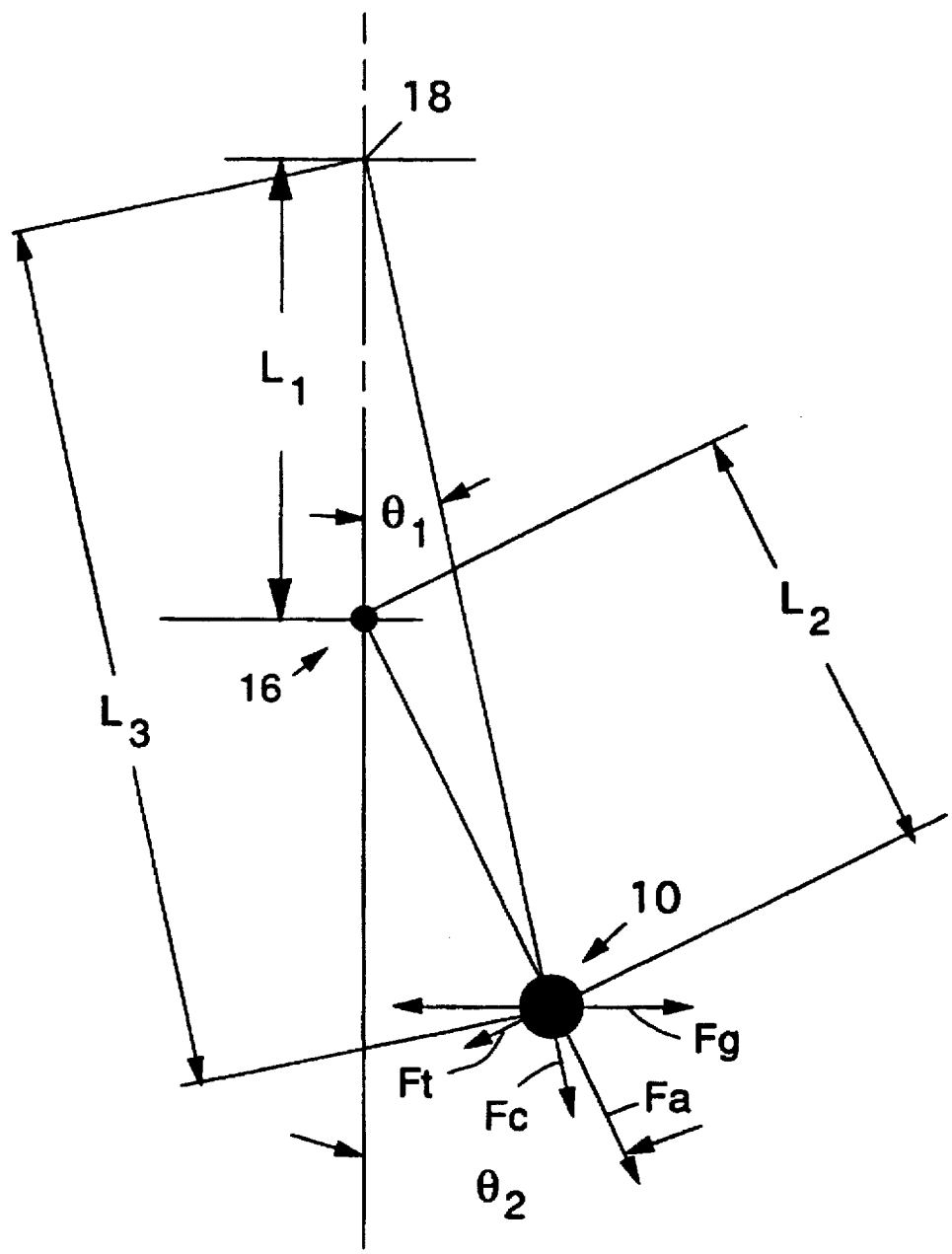
FIG. 1 is a conceptual schematic drawing of a pendulum/ pivot oscillating under the influence of both a cyclic gravity force, $F_g$, and a radial centripetal acceleration, $F_c$.
Figure 2A:
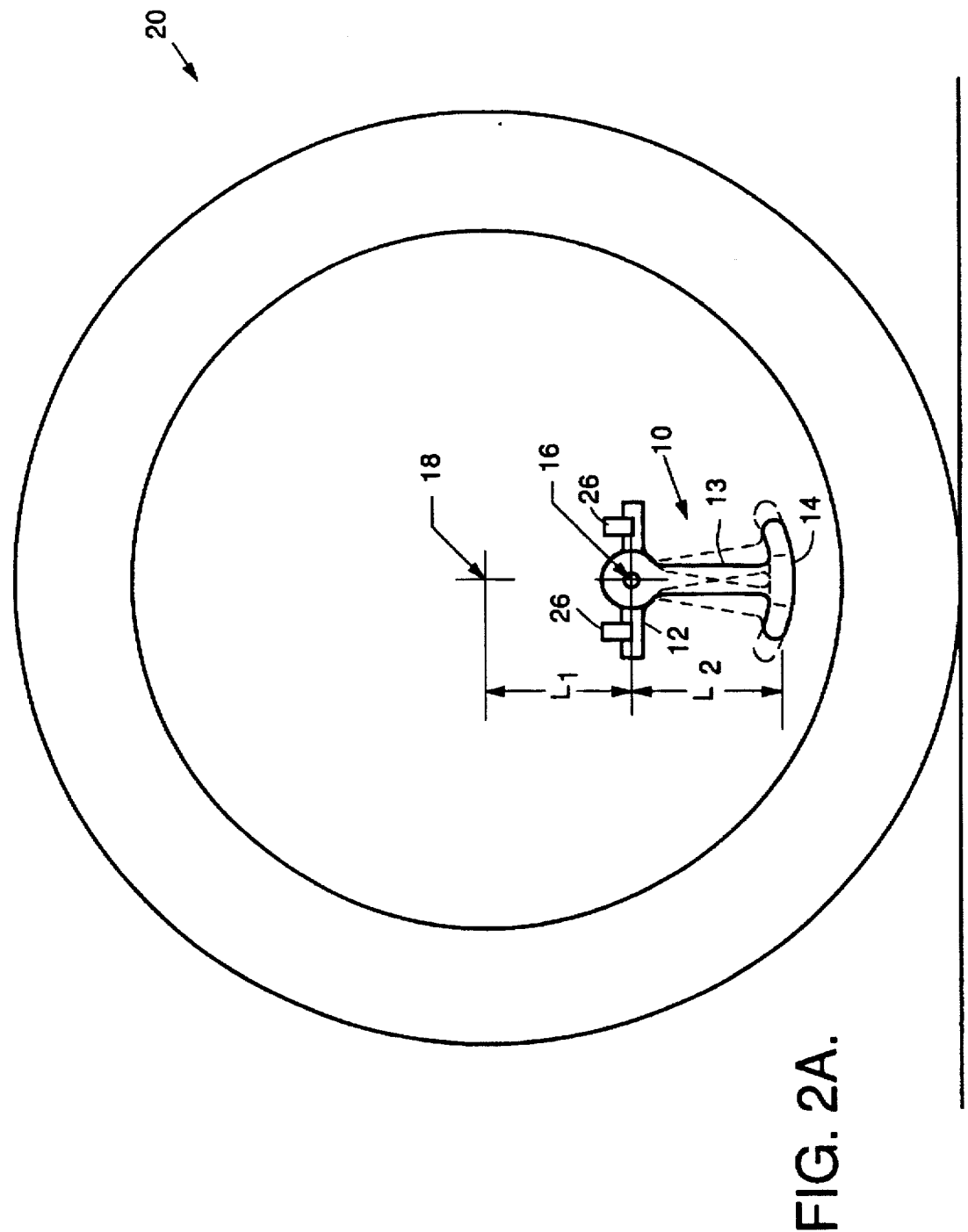
FIG. 2A is an idealized representation of a tuned resonant oscillating mass pump mounted on a wheel. This embodiment uses a pendulum as its tuned resonant oscillating mass for energy production.

The Figures, for example FIG. 2A, illustrate in idealized form an oscillating mass 10, such as a pendulum or a freely moving weight, mounted such that its axis of rotation or pivot point 16 is not mounted at the axis of rotation 18 of the wheel 20 and the radius of curvature of the mass 10 is therefore less than its distance from the axis of rotation 18 of the wheel 20. As wheel 20 rotates, the gravitational field remains fixed or, alternatively, from the frame of the wheel, the gravitational field appears to rotate around the frame. The pendulum 10 is illustrated as shaped with cross arms 12, stem 13, and lower portion 14. However, as mentioned earlier, the present invention can be practiced with any suitable oscillating mass. Furthermore, the invention is not restricted to any particular configuration for the pendulum in instances where a pendulum is used as the oscillating mass. The oscillating gravitational field excites mass 10 to move in one direction and then the other at a frequency equal to the wheel rotation. Resonance can be achieved simply by adjusting the length of the pendulum and the location of the pivot point. Also, this resonance can be set to always be equal to the rotational speed of the wheel. For an ideal point mass pendulum, the requirement is that the length of the pendulum, $L_2$, be equal to the distance, $L_1$, between its pivot point 16 and the wheel's center of rotation. (See FIG. 1). In practice, a pendulum is typically not a point mass and the ratio of $L_1$ to $L_2$ will be somewhat different but the general physics concept remains the same. (See FIG. 2A.) For vehicular application, it is preferred that two pumps 26 be used, each located symmetrically about the centerline between the pivot 16 and the pendulum mass and disposed such that they interact symmetrically with it. An embodiment with two pumps is preferred since two pumping strokes occur for every wheel rotation, thus providing more pumping activity and effecting an energy withdrawal from the pendulum that is symmetrical with respect to its oscillation. This symmetric power extraction permits the pendulum to behave more closely as a linear oscillator, thus avoiding potential problems with non-linear oscillatory behavior that may change its natural frequency and hence not precisely match its frequency to wheel rotation.

Figure 2B:
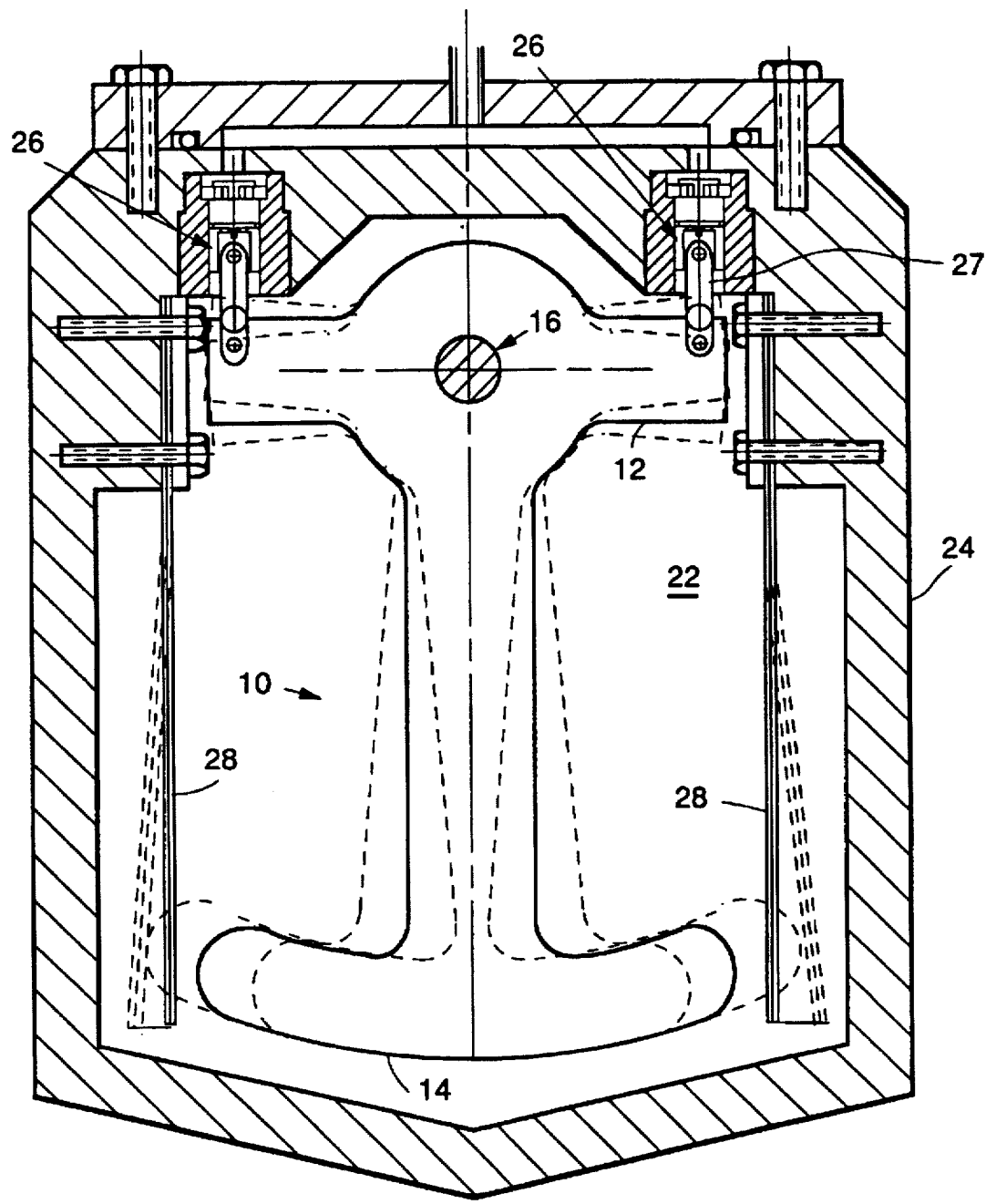
FIGS. 2B–2G are cross sectional views of a tuned resonant oscillating mass pump which uses a pendulum as its tuned resonant oscillating mass for energy production. Electrical energy is extracted from the movement of the pendulum when the pendulum interacts with a suitable object. In addition, energy is extracted from the pendulum's motion by two pumps above the cross arms of the pendulum structure. The pumps provide high pressure air to the internal volume of the tire for the purpose of maintaining its inflation.

FIG. 2B shows a pendulum embodiment of the present invention in an air pump that also includes the ability for electrical energy extraction due to the movement of the tuned oscillating mass.

A pendulum 10 is held in a pivotable, but freely swinging position in a chamber 22. During movement of the pump frame or casing 24, pendulum 10 freely swings in an arcuate path to reciprocate air pump pistons 26 by means of connecting links 27 pivotally connected to the top portions of cross arms 12. Pendulum 10 also freely swings in its arcuate path to strike piezoelectric elements 28 at the extremities of the swing of the pendulum 10.

The piezoelectric elements 28 are preferably piezoelectric bimorphs or piezoelectric stacks. Piezoelectric bimorphs are typically two piezoelectric plates cemented together with a conductive strip between them and conductive strips on their outside surfaces. A voltage applied across the two internal strips causes one to expand and the other to contract so that the bimorph bends in proportion to the applied voltage. Conversely, deflection of the bimorph generates electrical charge on the external strips. This charge can be drained off and used to produce electrical power. The motion of the pendulum can be used to deflect a piezoelectric bimorph whose electrical output can thus be used to power sensors or other electrical equipment.

This construction is simple for maintenance purposes and provides a high voltage, low current output electrical energy generator. The bimorphs are located near the extremities of the pendulum swing and serve not only to generate electrical energy, but also to provide a soft stop for the pendulum thereby saving on wear and tear of moving parts.

Figure 2C:
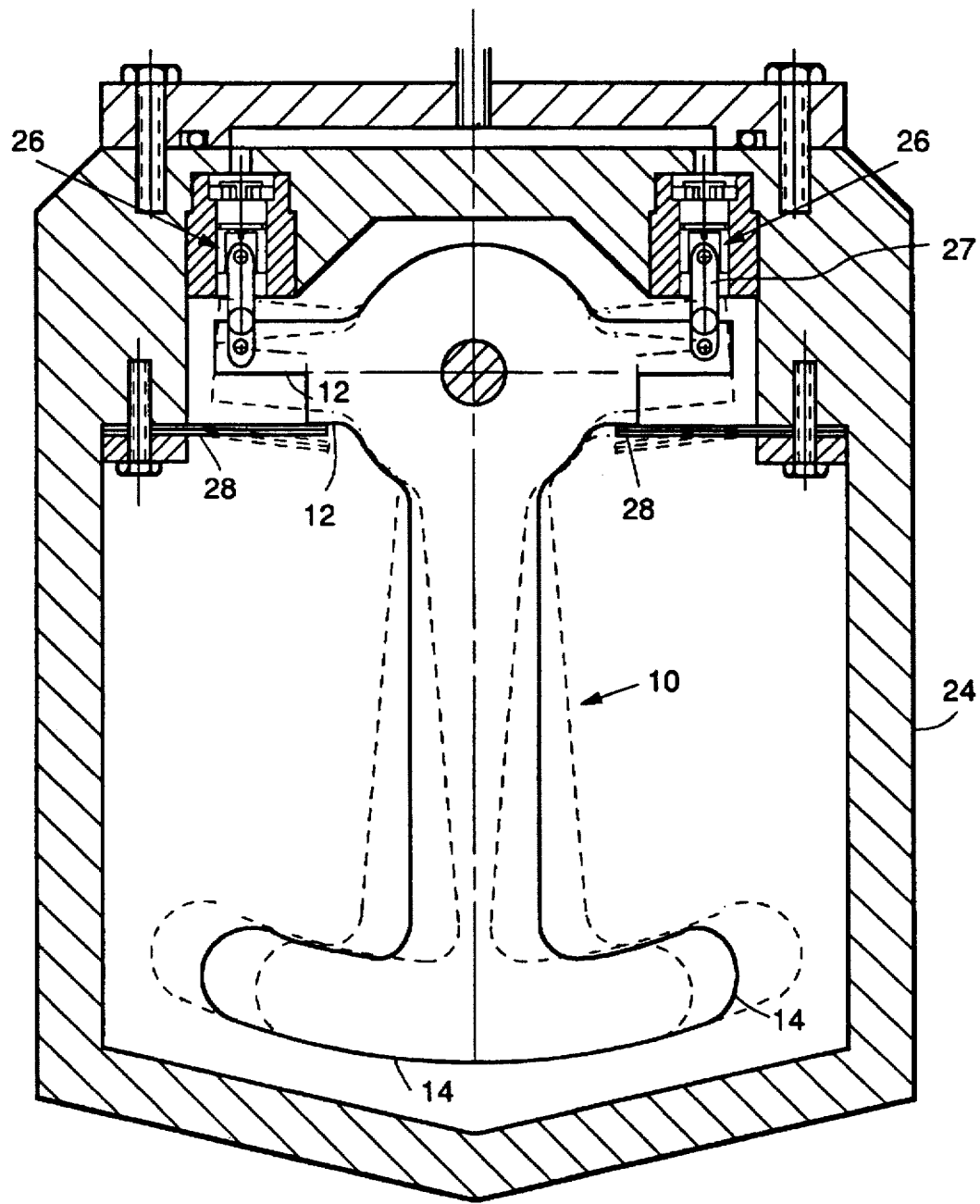

Alternatively, as shown in FIG. 2C. the bimorphs can be conveniently mounted for engagement by the pendulum cross-arm 12 instead of by the lower portion 14 of pendulum 10. The bimorphs 28 may be mounted near the extremities of the pendulum swing so that they extract mechanical energy only after the pendulum has built-up a reasonably large oscillating amplitude. This ensures that the pendulum will be oscillating at resonant conditions before energy is extracted. In addition, the mechanical impedance of the flexural bimorph may more closely match the effective impedance of the pendulum when it is desired to cause electrical energy extraction to occur near the end of the pendulum's stroke.

With bimorphs 28 located for engagement by the pendulum cross-arm 12 instead of by the lower portion 14 of the pendulum 10, bimorph actuation can occur over a larger fraction of the pendulum's swing. This permits a broader electrical pulse to be generated. By careful positioning of the bimorphs in relation to the pendulum swing, continuous activation of the bimorphs may produce a continuous sinusoidal current signal. Various voltage waveforms may be generated depending on where the piezoelectric bimorphs are located in the specific device. The cross arm 12 can be suitably configured, for example as shown in FIG. 2C, to adapt it for actuating the bimorphs.

Figure 2D:
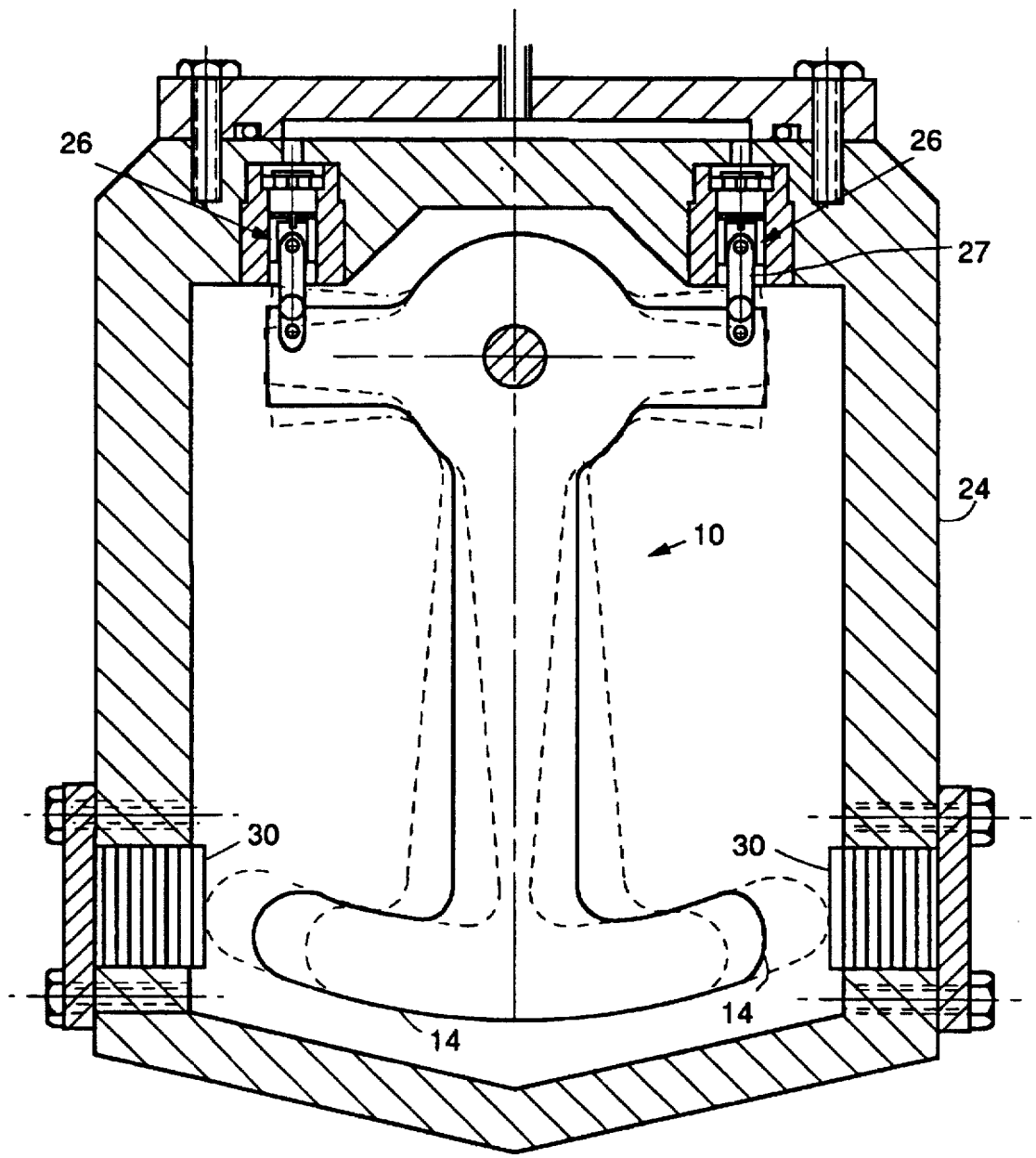

Another embodiment of the present invention for extracting electrical energy due to the movement of the tuned oscillating mass is illustrated in FIG. 2D and incorporates the use of piezoelectric stacks 30 in place of bimorphs previously described above. A piezoelectric stack consists of a multiplicity of piezoelectric slabs stacked one on another with a thin metal foil sandwiched between each pair of piezoelectric slabs. Every other foil is connected to a first common buss wire. The remaining foils are connected to a second buss wire. Voltage and charge difference is generated between the two buss wires when the piezoelectric stack is either compressed or stretched. This voltage and charge may be used to power electrical equipment.

A piezoelectric stack 30 can be used as a bumper to limit the pendulum's swing. The stack is compressed when impacted by the pendulum causing it to create an output voltage and charge. This output can be used to power various electrical equipment such as sensors or transmitters.

FIG. 2D shows a structure where piezoelectric stacks 30 are compressed by impact with the lower portion 14 of the pendulum 10 at or near the extremity of its swing. This construction provides for high voltage in a very short duration pulse caused by the low elasticity of the stack and the impact of the pendulum. Cushioning or softening materials may be placed on the stacks to alleviate damage caused by the effect of impacts over the long term.

Figure 2E:
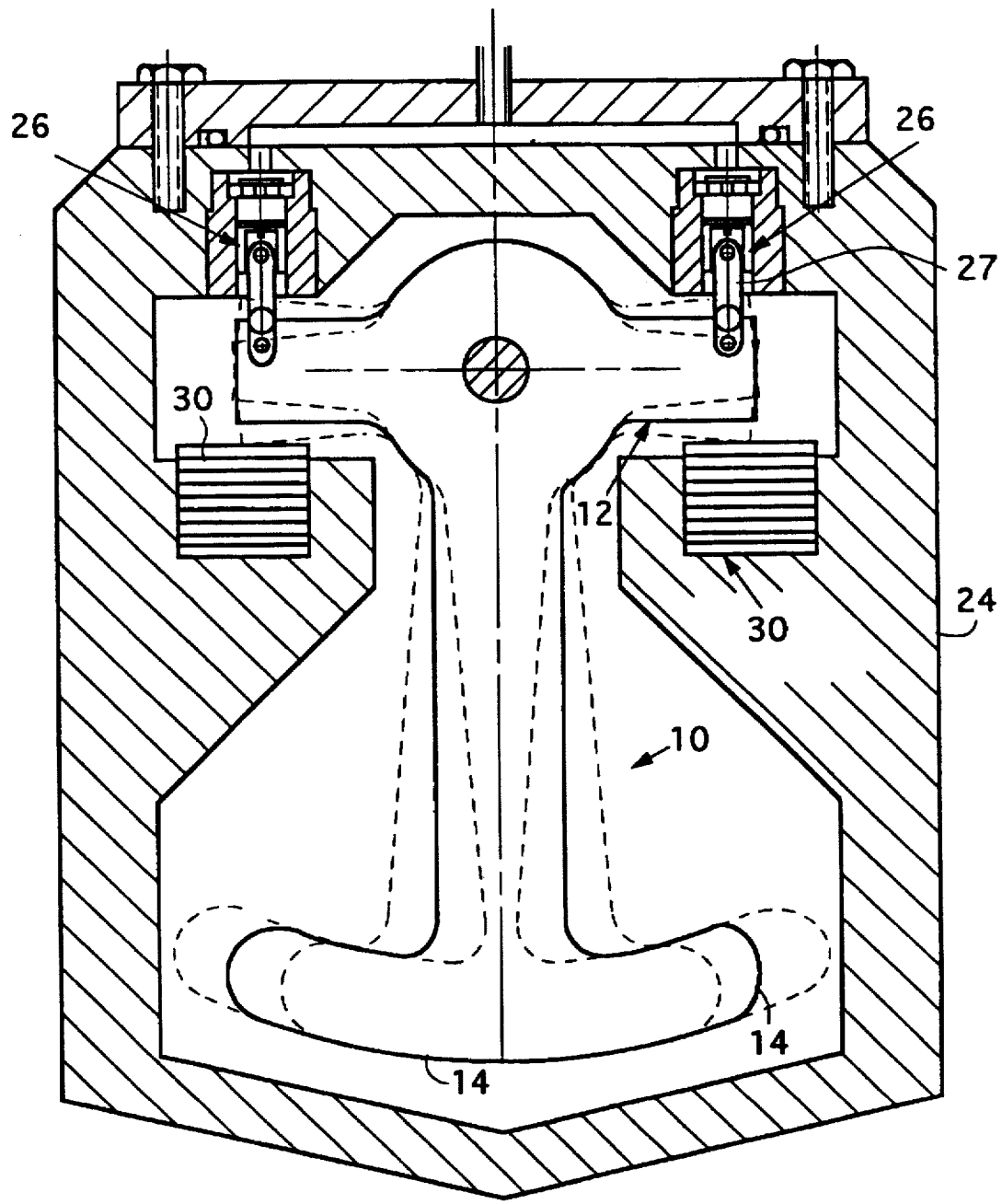

FIG. 2E shows a construction where the piezoelectric stacks 30 are impacted by the pendulum cross-arm 12 instead of the lower portion 14 of the pendulum 10. This construction features a higher force and longer duration contact with the piezoelectric stack 30 as discussed previously above with regard to FIG. 2C. The pendulum cross-arms 12 may cause less damage to the piezoelectric stacks 30 than the previously discussed construction where the lower portion 14 of the pendulum 10 impacts the stacks 30, since the cross-arms 12 impact the stacks 30 at a lower velocity than the pendulum end portion 14.

The forces exceeded by the stacks 30 on the pendulum cross-arms 12 during impact may lift pendulum 10 off its bearing or cause excessive wear of the pivot bearing. This may be important and should be accounted for when considering this particular embodiment of the instant invention.

Figure 2F:
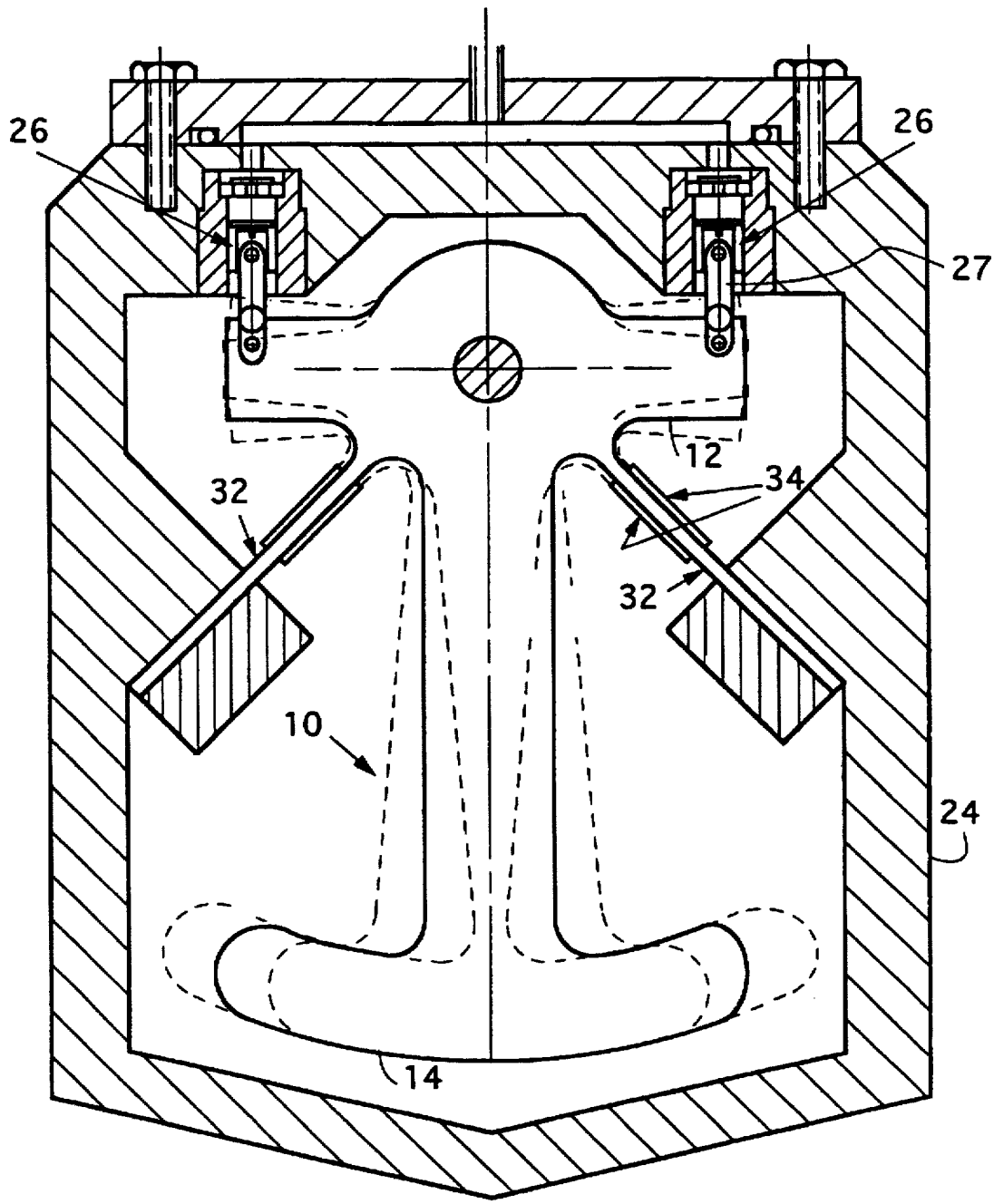

FIG. 2F shows another embodiment of the present invention where the pendulum 10 is suspended for movement from a flexure 32 instead of a shaft. Piezoelectric slabs or crystals 34 are installed on either side of the flexure 32 to generate electrical pulses from the strains caused by the flexure 32 during pendulum movement similar to a strain gauge. This construction also avoids damage that could be caused by the impact of the pendulum 10 on the piezoelectric crystals 34.

Figure 2G:
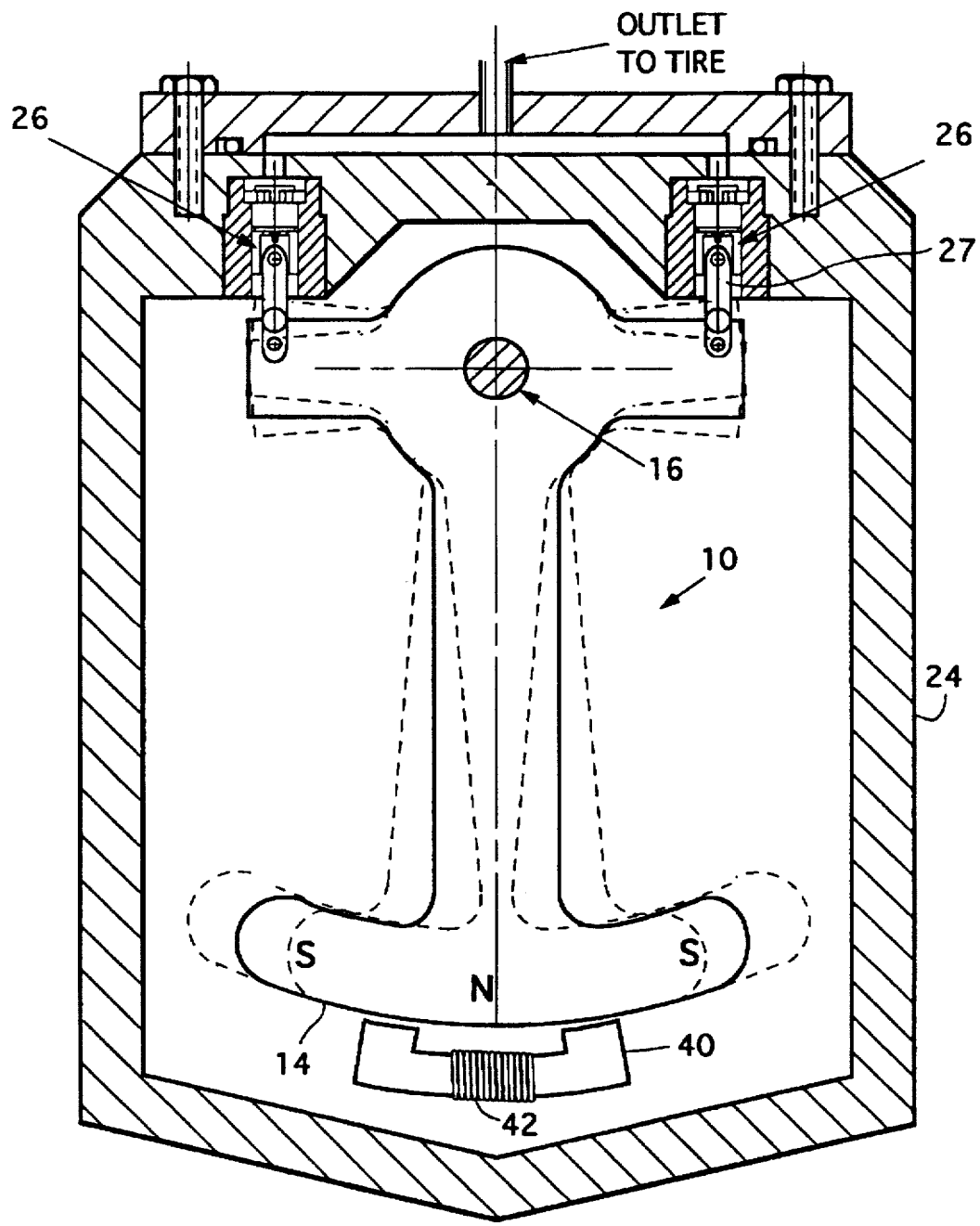

FIG. 2G illustrates a cross-sectional idealized view of a tuned resonant oscillating mass pump using a pendulum as its tuned resonant oscillating mass for energy production where electrical energy is extracted from the movement of the pendulum by magnetizing the lower portion 14 of the pendulum and letting this magnetized end swing past an armature/pickoff coil combination. As illustrated, the lower portion of the pendulum has its center magnetized North and its ends magnetized South. The armature 40 pickoff coil 42 is situated proximate the end of the pendulum 10 and centered between its extremes of motion. Therefore, as the pendulum swings left and right under the influence of gravity, the armature 40, due to its close proximity to the lower portion of the pendulum, will be alternatively magnetized North-to-South, and then South-to-North, these directions being taken for convenience from the right hand side of the armature as shown in FIG. 2G, so that due to the reversing magnetic field in the armature 40, voltages are generated in the pickoff coil 42. These voltages may be used to provide useful power to electronic apparatus also mounted in the rotating wheel. Other implementations of the invention shown embodied in FIG. 2G are possible and can include, for example, a bipolar magnetization of the lower portion of the pendulum instead of a tripolar magnetization or the use of an E-shaped core armature instead of the C-shaped core armature shown for convenience in this illustrated embodiment of the present invention.

All of the embodiments illustrated in FIGS. 2B to 2G, have the unique property that the pendulum, once adjusted properly with respect to the pivot point location and length, will resonate at the wheel rotational frequency at all wheel speeds.

The instant invention uses a coupling between the alternating gravity field which acts on the pendulum mass as the tire rotates to produce pumping action and electrical power.

However, this application is fundamentally different from the previously discussed crankshaft application. In the crankshaft application, the motion of the pendulum is used to generate frictional energy dissipation. This frictional energy dissipation reduces the vibrational amplitude of the crankshaft and produces no useful work. The present invention, on the other hand, uses the tuned resonant oscillating mass mechanism to efficiently extract useful energy from the rotating gravity field and to deliver this energy for other purposes such as maintaining tire pressure and/or delivering electric power to on board instrumentation.

FIGS. 2A–2G illustrate methods of extracting work from the oscillating pendulum and using this work to compress air from the surrounding ambient into the internal volume of the tire. This is accomplished by a pair of piston pumps attached to the cross-arms of the pendulum. The actual arrangements of the pendulum and piston pumps may be different from those shown in the Figures and the scope of the present invention is not limited to the specific arrangements of the pendulum and piston pumps presented herein. Other variations may be straightforwardly derived by those experienced in the art of mechanical design from the principles of work extraction taught herein and illustrated by the Figures.

If the pendulum is tuned exactly to the wheel's rotational speed, gravity forces will pull the mass first in one direction and then in the other. Since the pendulum is operating at resonance, the gravity force applied over the pendulum's stroke will be transformed entirely into kinetic energy of the pendulum's motion. The pendulum's motion will continuously increase under the influence of this oscillating gravity field until some dissipative means acts to reduce its amplitude.

In addition to dissipating pendulum motion by pumping air, this instant invention may also extract pendulum energy by electromagnetic means. Such approaches are illustrated in FIGS. 2B to 2G. The mechanics of electrical energy extraction may be electromagnetic, piezoelectric, or ferromagnetic. For the sake of illustration, piezoelectric and electromagnetic energy extraction means have been shown and discussed herein. However, the broad inventive concept taught herein, namely, that useful amounts of electrical energy may be extracted from the tuned resonant oscillating mass' motion as it is excited at resonance by the oscillating gravity field created by wheel rotation is not limited to the piezoelectric and electromagnetic energy extraction means.

The tuned oscillating mass tire pump of the present invention may be used to provide electrical power to on-board sensors, transmitters or other electrical equipment, in addition to providing high pressure air to the tire.

It is to be noted that, whether the energy extraction means is pumping air to the tire's internal volume or creating electrical energy to run electrical sensors, controls, radio transmitters, and/or signaling devices, it provides two instances of energy generation with every wheel rotation. Thus, as the car's velocity increases and the wheel's rotational velocity increases, the energy production of this invention will increase. This provides the useful benefit of providing increased power for pumping at high speeds, which may be used to overcome increased pump friction. It also provides for increased sensor and radio transmitter electrical power so that a driver may be warned of impending problems when on a high speed highway.

Figure 3A:
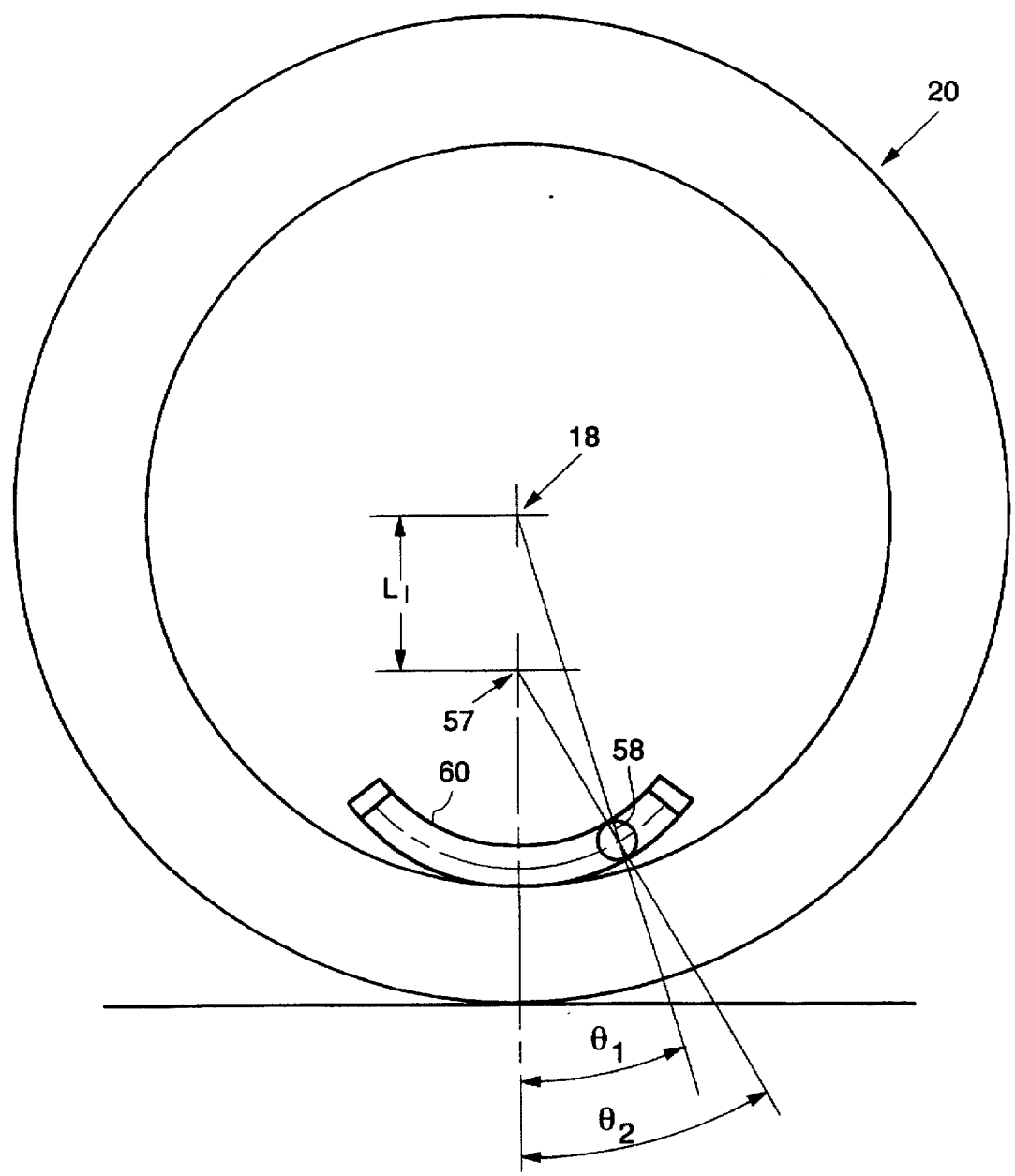
FIG. 3A is a view similar to FIG. 2A which uses a rolling ball in an arc track as its tuned resonant oscillating mass for energy production.

The above teachings are not restricted to use of a pendulum as the oscillating mass. Any low energy dissipation suspension/guidance concept which allows a mass to move or roll in the wheel's centripetal acceleration field in such a manner that the mass tends to seek a centered, neutral position may be adjusted so as to achieve the above described resonance at wheel rotational speed. A specific embodiment of this principle is shown in FIG. 3A which illustrates a ball rolling in a curved track. The track is shown as being nominally a circular arc with a center 57, although other curved path means may be employed.

The embodiment, shown in FIGS. 3A to 3G, incorporates a mass 58, preferably a ball or cylinder, constrained to move in a curved track 60 of approximate radius of curvature smaller than its distance to the axis of rotation of the wheel 20 within which it is mounted. By approximate radius of curvature it is meant that the radius of curvature need not be constant but may deviate substantially from that of a true arc in order to obtain maximum efficiency. As the wheel rotates, mass 58 experiences an oscillating gravitational field similar to that described above in connection with the embodiments of FIGS. 2A to 2G. For comparison with FIGS. 1 and 2A, FIG. 3A includes the distance $L_1$ to the center of rotation 18 and the angles $\theta_1$ and $\theta_2$ of those figures. Mass 58 oscillates at the frequency of the wheel 20 with resonance determined by geometrical parameters such as the track having a radius of curvature and being positioned on wheel so that rotation of the wheel at any rotational speed results in a resonant oscillation of mass 58 on its track. In this embodiment, pumps or pistons may be located at the extremes of the mass's travel to convert the motion of the mass pumping power as described below with reference to FIGS. 5A and 5B. The motion of the moving mass can also be used to create electrical energy as described below energy as described below with reference to FIGS. 3B–3G which are cross sectional views taken along the plane 3B—3B of FIG. 5B. FIGS. 3B–3G are inverted for clarity of comparison with FIG. 3A.

Figure 3B:
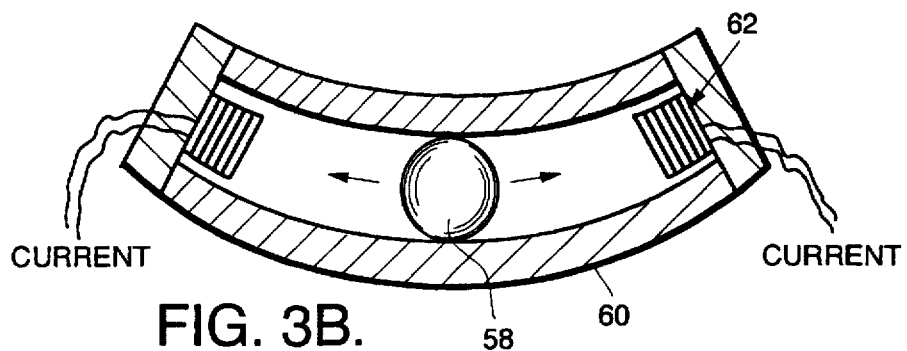
FIG. 3B is an inverted cross sectional view along the plane 3B—3B of FIG. 5B that shows one rolling ball embodiment which uses piezoelectric stacks at the extremes of the ball's movement to generate electrical power.

FIG. 3B shows one implementation of the rolling ball embodiment of the present invention. In FIG. 3B, piezoelectric elements 62 are placed at the extremes of travel for the mass 58 in an arcuate chamber 60. As mass 58 rebounds off each piezoelectric element 62 at the end of its travel, a force is applied to the element and a voltage pulse is generated. Two pulses will be produced per wheel revolution.

Electrical energy may also be extracted using electromagnetic phenomena. One technique involves making the oscillating mass magnetic and directing it to travel through or near a pick-up coil. The other technique involves locating the magnet and pick-up coil external to the mass on the arc track housing.

Figure 3C:
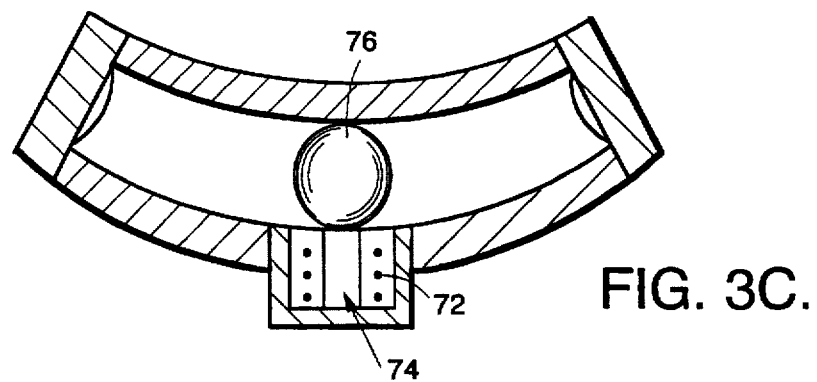
FIG. 3C is a view similar to FIG. 3B that shows another rolling ball embodiment which uses a magnetic rolling ball and a coil to produce electrical power.

FIG. 3C illustrates the electromagnetic configuration where the oscillating mass is magnetic. In this case the pick-up coil 72 is wrapped around the central pole piece 74. As the mass passes by the coil, it closes the magnetic circuit, thus generating voltage pulses in the coil. Alternatively, coil 72 can be wrapped around the arc track so that mass 76 moves past it. While it is likely that the North-South pole of the magnetic mass 76 will not be constrained to move in a predetermined manner, it is still true that in both cases the flux density in the pick-up coil will change, thereby generating current. This embodiment may not be suitable for applications in which energy losses associated with eddy currents caused by the constantly changing magnetic field must be avoided.

Figure 3D:
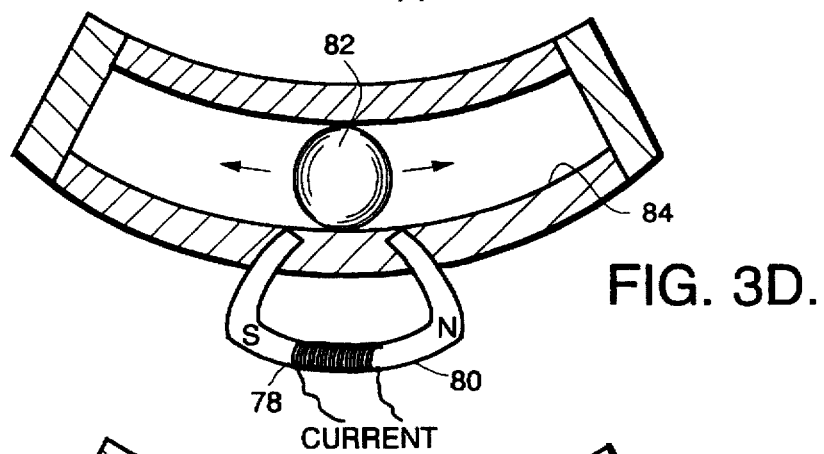
FIGS. 3D, 3E and 3F is a view similar to FIG. 3B that show other rolling ball embodiments which use a magnet and a coil to produce electrical power.
Figure 3E:
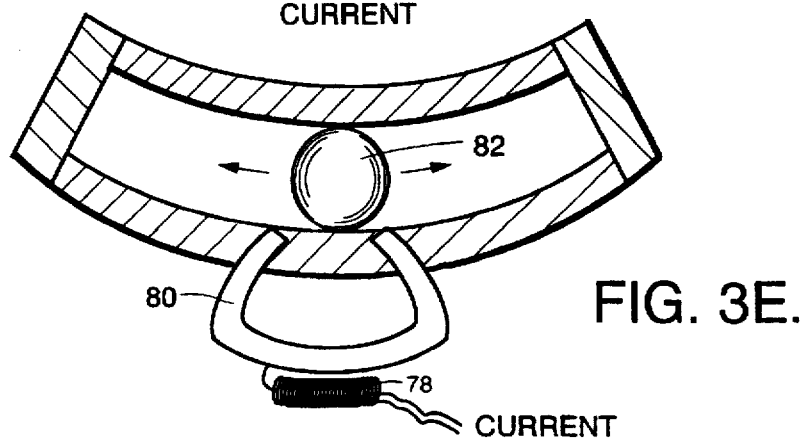
Figure 3F:
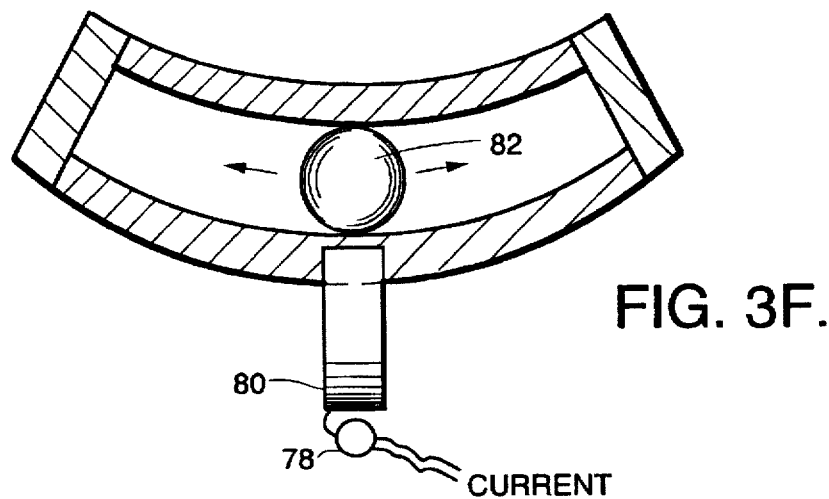
Figure 3G:
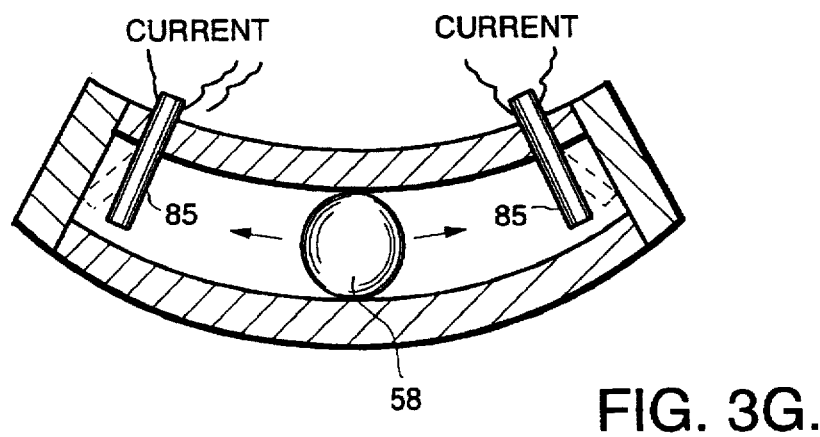
FIG. 3G is a view similar to FIG. 3B that shows another rolling ball embodiment which uses piezoelectric bimorphs at the extremes of the ball's movement to generate electrical power.

FIGS. 3D and 3E illustrate the electromagnetic configuration where the magnetic element is located external to the oscillating mass. Again there are two possibilities, one where the pick-up coil 78 is wrapped around the magnet 80, and one where pick-up coil 78 is located near the magnet 80. In FIG. 3D wherein the coil 78 is located around magnet 80, the passing of the ball 82 in chamber 84 serves to reduce the reluctance of the magnetic circuit thereby increasing the flux through the circuit. In FIG. 3E, the presence of the ball 82 changes the flux lines in the magnet 80 such that they are significantly reduced outside the magnet where the pick-up coil 78 is located. Again this change in flux density through the pickup coil 78 generates a current in the coil 78. Alternatively the magnet can be positioned so that it is rotated by 90° or by some other suitable angle with respect to the location illustrated in FIGS. 3D and 3E. This structure, shown in FIG. 3F, enhances electromagnetic coupling and hence increases electrical power production. FIG. 3G is a view similar to FIG. 3B in which the piezoelectric elements 62 of FIG. 3B are replaced with piezoelectric bimorphs 85 that are positioned for engagement by the mass 58.

As is the case for the piezoelectric generators, the electrical energy from the electromagnetic generators can be used immediately or stored in a capacitor or battery for future use.

Figure 4:
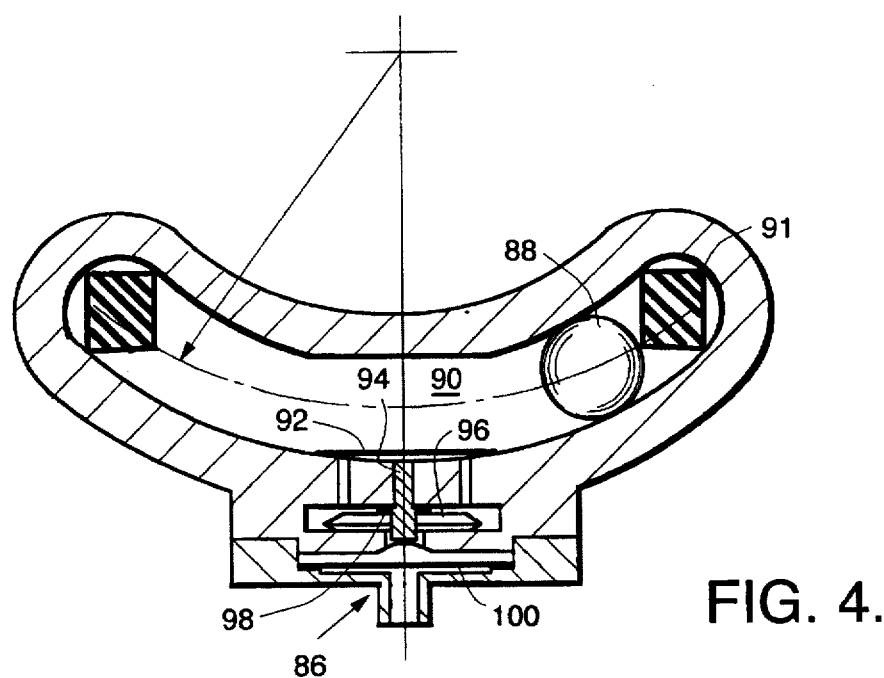
FIG. 4 is an illustration of a tuned resonant oscillating mass pump which uses an arc track, a rolling ball and a center mounted pump structure.

The embodiment shown in FIG. 4 is similar to the curved track or arcuate chamber embodiments described above. It provides a structure having high energy coupling and efficient energy use. The difference in this embodiment over those previously discussed, is the location of the pump. In this embodiment, a single pump 86 is located near the center of travel of the mass 88 in arcuate chamber 90. Rubber bumpers 91 may be provided at the extremities of the mass' swing. The pump 86 is actuated by the mass 88 rolling over a flex plate 92 located in the center of chamber 90. This flex plate 92 reciprocates a drive pin 94 down against a bellows 96 which is the pumping mechanism. The drive pin 94 has a soft elastomeric washer 98 on its lower surface which seals off the top hole in the bellows 96. This constitutes closing the inlet valve. As the drive pin 94 is pushed downward, the bellows 96 closes, forcing its internal air out through the outlet valve 100. The drive pin 94 is sufficiently long to assist in opening the outlet valve 100. This reduces pressure losses and increases pumping efficiency.

Figures 5A, 5B:
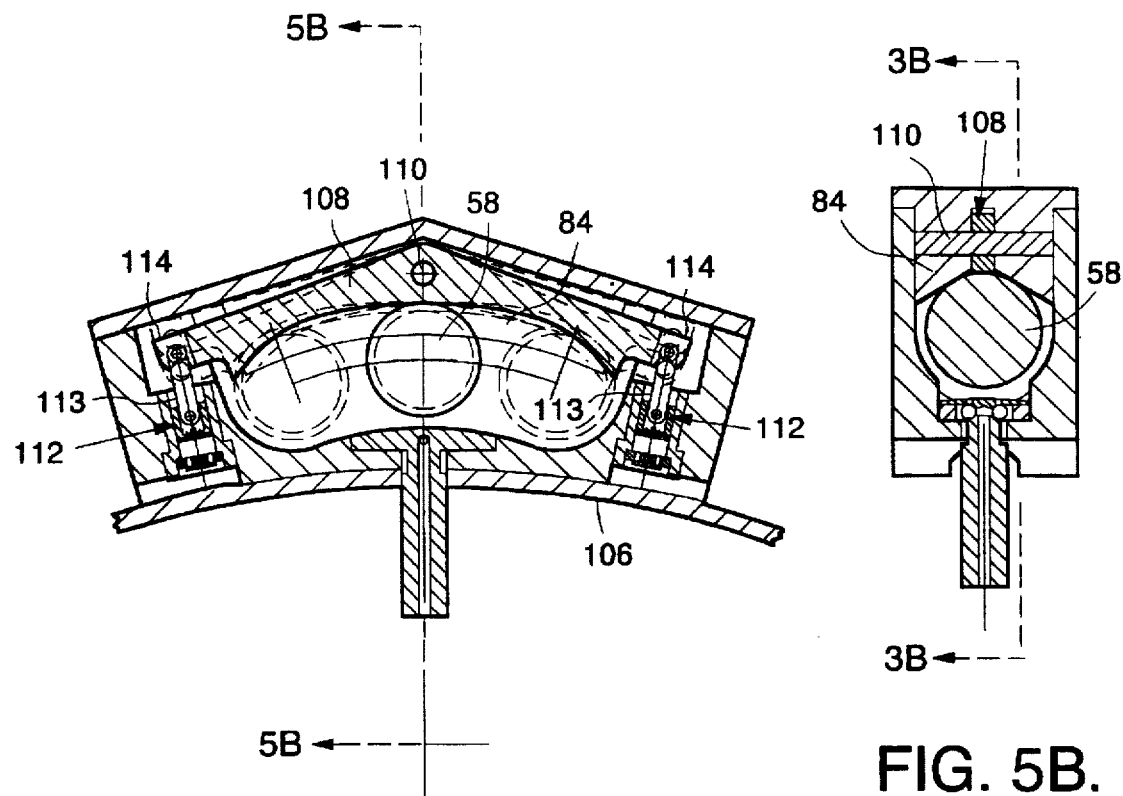
FIG. 5A is an illustration of a tuned resonant oscillating mass pump and electrical energy generator which uses an arc track, a rolling ball and a center pivotally mounted rocker arm connected to two pumping structures and various electrical energy generator structures coupled to the rolling ball at its extremes.
FIG. 5B is a cross-sectional view of the FIG. 5A embodiment taken along along the plane 5B—5B.

FIGS. 5A and 5B illustrates a preferred embodiment of the present invention where a mass 58, such as a bell is free to move within an arcuate chamber 84 fixed for rotation to the rim 106 of a tire. As rim 106 rotates, the mass 58 oscillates to and fro within chamber 84 and its motion causes rocker arm 108, pivoted about point 110, to pump alternatively pistons 112 by reciprocating connecting links 113 mechanically attached at the extremes 114 of rocker arm 108 that are adapted for air compression. Electrical energy is created by this structure by employing any of the electrical generating structures associated with embodiments as shown above in FIGS. 3B–3G which are cross sectional views along the plane 3B—3B of FIG. 5B. FIG. 5B is a cross sectional view of FIG. 5A taken along the plane 5B and 5B.

Each of the embodiments described here can be made to perform useful 'work' and to pump up tires. The key is to extract a small portion of the kinetic energy of the oscillating mass each time it swings from one side to the other. The pendulum embodiments of FIG. 2 accomplish this by letting the respective cross arms of the pendulum contact the respective pistons of respective pumps and drive them. The embodiment of FIG. 4 requires a rolling mass travelling over the entire length of the flex plate in order for the pump to operate at full effectiveness. At high wheel speeds, this may not be achievable and pumping efficiency may suffer reductions. The rocker arm embodiment of FIGS. 5A and 5B is not limited like the FIG. 4 embodiment and should operate well at high speeds.

In general, to illustrate the potential of the present invention, a rough calculation shows that an 18 gram mass oscillating at a ±0.725 inch stroke at 30 mph will pump a baseline tire (1455 in$^3$, 30 psig average pressure) 1 psi in about three (3) hours. This can be compared to earlier systems that pump 2 psi per month of normal driving and weigh 360 grams.

The invention described above is, of course, susceptible to many variations, modifications and changes, all of which are within the skill of the art. It should be understood that all such variations, modifications and changes are within the spirit and scope of the invention and of the appended claims. Similarly, it will be understood that Applicant intends to cover and claim all changes, modifications and variations of the example of the preferred embodiment of the invention herein disclosed for the purpose of illustration which do not constitute departures from the spirit and scope of the present invention.

What is claimed is:

1. A pump, comprising:
    a frame adapted to rotate;
    an arcuate chamber formed in said frame;
    a piston adapted for reciprocal movement for exerting a pumping action whenever said piston is reciprocated, said piston at least partially extending into said chamber; and
    a mass disposed in said chamber and coupled to said piston, responsive to rotation of said frame, for causing reciprocal movement of said piston, said mass freely movable within said chamber and disconnected from said piston but shiftable in an arcuate path along said chamber in response to rotation of said frame for causing reciprocal movement of said piston by contact with said piston;
    said chamber having a radius of curvature and positioned in said frame so that rotation of said frame at any rotational speed results in a locally rotating gravity vector acting on said mass and causing a resonant oscillation of said mass in said chamber, said radius of curvature being adjusted to rotation of said frame such that the resonant oscillation frequency matches the rotation oscillation frequency of a device in which said pump is positioned for all rotational frequencies of interest.

2. The pump of claim 1, further including:
    an electrical energy generator associated with said mass and configured to generate electrical energy from reciprocal movement of said mass in said chamber.

3. The pump of claim 2, wherein said electrical energy generator comprises:
    at least one piezoelectric member extending at least partially into said chamber and adapted for contact with said mass for generating electrical energy.

4. The pump of claim 3, wherein said piezoelectric member comprises a pair of piezoelectric stacks, each stack located in said chamber at a swing extremity of said mass in said chamber.

5. The pump of claim 3, wherein said piezoelectric member comprises a pair of piezoelectric bimorphs, each bimorph located in said chamber at a swing extremity of said mass in said chamber.

6. The pump of claim 2, wherein said mass is fabricated from a magnetized material and said electrical energy generator comprises a pick-up coil magnetically coupled to said mass so that reciprocal movement of said mass in said arcuate chamber causes a magnetically induced current to flow in said pick-up coil.

7. The pump of claim 6, wherein said pick-up coil is positioned around said chamber and generally perpendicular to said arcuate path of said mass in said chamber.

8. The pump of claim 2, wherein said mass is fabricated from a magnetizable material, and said electrical energy generator comprises:

a magnet positioned adjacent said chamber and magnetically coupled to said mass; and a pick-up coil magnetically coupled to said magnet, so that reciprocal movement of said mass in said arcuate chamber causes a magnetically induced current to flow in said pick-up coil.

9. The pump of claim 8, wherein said pick-up coil is positioned around said magnet.

10. The pump of claim 1, wherein said frame is a tire rim.

11. The pump of claim 1, wherein said mass is a ball.

12. A pump, comprising:

a frame adapted to rotate;

an arcuate chamber formed in said frame;

a bellows coupled to said chamber for exerting a pumping action whenever said bellows is actuated; and a mass disposed in said chamber, said mass freely movable within said chamber along an arcuate path in said chamber to actuate said bellows in response to rotation of said frame;

said chamber having a radius of curvature and positioned in said frame so that rotation of said frame at any rotational speed results in a locally rotating gravity vector acting on said mass and causing a resonant oscillation of said mass in said chamber, said radius of curvature being adjusted to rotation of said frame such that the resonant oscillation frequency matches the rotation oscillation frequency of said frame.

13. The pump of claim 12, further including:

a flexible member positioned in said chamber for contact with said mass; and a pin which couples said flexible member and said bellows.

* * * * *